(12) United States Patent
McKenzie et al.

(10) Patent No.: US 8,496,087 B2
(45) Date of Patent: Jul. 30, 2013

(54) FITTING SYSTEM FOR A HYDRAULIC TUNING CABLE

(75) Inventors: Christopher W. McKenzie, Toledo, OH (US); Christopher L. Schwab, Toledo, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/178,832

(22) Filed: Jul. 8, 2011

(65) Prior Publication Data

US 2012/0006616 A1    Jan. 12, 2012

Related U.S. Application Data

(60) Provisional application No. 61/363,424, filed on Jul. 12, 2010.

(51) Int. Cl.
*F16L 55/02* (2006.01)

(52) U.S. Cl.
USPC .......................................................... 181/233

(58) Field of Classification Search
USPC ...................................... 181/233; 138/26, 30
See application file for complete search history.

(56) References Cited

U.S. PATENT DOCUMENTS

| | | | |
|---|---|---|---|
| 3,323,305 A | 6/1967 | Klees | |
| 4,303,263 A * | 12/1981 | Legris | 285/249 |
| 4,611,633 A * | 9/1986 | Buchholz et al. | 138/26 |
| 4,671,380 A * | 6/1987 | Henderson et al. | 181/233 |
| 4,809,751 A * | 3/1989 | McKenzie | 138/89 |
| 5,201,343 A * | 4/1993 | Zimmermann et al. | 138/26 |
| 5,539,164 A | 7/1996 | van Ruiten | |
| 5,728,981 A * | 3/1998 | van Ruiten | 181/233 |
| 5,791,141 A | 8/1998 | Phillips | |
| 6,688,423 B1 | 2/2004 | Beatty et al. | |
| 6,917,907 B2 | 7/2005 | Hsi et al. | |
| 7,007,718 B2 * | 3/2006 | Chen et al. | 138/26 |
| 7,373,824 B2 * | 5/2008 | Krieger et al. | 73/700 |
| 2010/0007134 A1 * | 1/2010 | Elton et al. | 285/31 |

* cited by examiner

*Primary Examiner* — Jeremy Luks
(74) *Attorney, Agent, or Firm* — Rader, Fishman & Grauer PLLC

(57) ABSTRACT

A tuning tube that can be easily changed out without destroying the hydraulic hose assembly in which it is located where the tuning tube is retained on the sleeve section of a secondary fitting and the secondary fitting has a collar section that is held in a receiving bore formed in an inlet cavity. The connector is connected at an inlet end to a hydraulic system component such as a pump and is connected at an outlet end to a hydraulic hose. The tuning tube extends into the hydraulic hose from the secondary fitting and the connector.

12 Claims, 4 Drawing Sheets

FITTING SYSTEM FOR A HYDRAULIC TUNING CABLE

CROSS-REFERENCE TO RELATED CASES

This application claims the benefit of provisional application Ser. No. 61/363,424, filed on Jul. 12, 2010. This application is related to application Ser. No. 13/178,794, filed on the same day as this application and to application Ser. No. 13/178,849, also filed on the same day as this application.

TECHNICAL FIELD

The present invention relates to suppression of fluid system noise using a tuning cable or tube within a fluid conveyance hose and more particularly to the structure and method of attaching the tuning cable to a fitting for inclusion in a hydraulic system and providing for ease of replacement of the tuning cable.

BACKGROUND

Fluid borne noise generated within a pressurized hydraulic system which uses a pump such as an automotive power steering system, can cause undesired noise and vibration. The oscillating pressure ripples generated by the hydraulic pump are carried within the hydraulic hose and tubing and cause other components to vibrate and emit noise. The use of a tuning cable mounted within a fluid conveyance hose to attenuate these pressure oscillations is known in the art with a description of such a system in U.S. Pat. No. 3,323,305 entitled Attenuation Device and issued to G. Klees on Jun. 6, 1967. The fluid noise reduction structure of the prior art comprises a flexible metal tube, called a tuning cable, that is placed inside a section of hydraulic hose. In the alternative, the tuning cable can be made of an engineered plastic such as PTFE or nylon or some other suitable material or combination of materials. The tuning cable can have holes formed along its length to increase the level of attenuation of the pressure pulses and hence, the level of generated noise. The length of the tuning cable must be specifically selected to provide the highest level of attenuation depending on the frequencies generated by the pump and the natural vibration frequencies of the various components. Sometimes this can be empirically determined but more often, trial and error is used to determine the correct length of the tuning cable along with the location and size of any holes or apertures along its length. Thus, it would be desirable to have a development system that would permit the tuning cable to be easily changed. The prior art systems require that a new hydraulic hose be made using each revised tuning cable which is time consuming and expensive.

The tuning cable can be spirally wound metal wall with a discontinuous wall construction that results in a distributed leakage along the length of the tuning cable. Or, it can be made of a continuous tube or of a continuous tube that has apertures formed along its length. The tube can be made of metal or of a suitable plastic material. The fitting used at the end of the hydraulic hose to attach the tuning cable varies depending on the type of material and wall structure that is used for the tuning cable. If the tuning cable is made of a plastic tube material, the tube can be slipped over a barbed end formed on an extension from the connector fitting. The hose is then attached to the connector fitting using a crimped socket.

SUMMARY

The exemplary tuning tube assembly includes a tuning tube that can be easily changed out without destroying the hydraulic hose assembly in which it is located where the tuning tube is pressed onto the sleeve section of a secondary fitting and the secondary fitting has a collar section that is held in a receiving bore formed in an inlet cavity. The connector is connected at an inlet end to a hydraulic system component such as a pump and is connected at an outlet end to a hydraulic hose. The tuning tube extends into the hydraulic hose from the secondary fitting and the connector.

The exemplary tuning tube can be a plastic tube or a PTFE tube or rubber or a metal tuning cable or other suitable material or construction that is attached to a secondary fitting which is inserted into the hydraulic connector and can be easily removed from the connector and then re-assembled to the connector without disturbing the hydraulic hose that is permanently attached to the connector. The tuning tube can retained by the secondary fitting using a variety of techniques such as an interference fit, barbs formed on the secondary fitting, crimping, adhesive(s), a collet system or using a relatively sharp ridge formed on the secondary fitting.

Using the tuning tube (sometimes called a tuning cable) and fittings of the exemplary tuning tube, the tuning tube can be easily modified in an effort to tune the tube to maximize the noise attenuation in each installation. After the secondary fitting with the attached tuning tube is removed from the primary fitting, the secondary fitting with a modified tuning tube can be inserted into the primary fitting and the cable assembly installed into the hydraulic system. In the alternative, the tube can be removed from the secondary fitting and a tube having a different geometry or design inserted into the secondary fitting and secured. The original secondary fitting with the new tuning tube can be inserted and secured to the primary fitting.

In the illustrated embodiment, a secondary fitting is designed to be slipped into the central cavity of a primary fitting. The sleeve section of the secondary fitting is pressed into the tuning tube to make up the tuning tube retention assembly. After the tube retention assembly is slipped into the hydraulic connector, the connector can be attached to the hydraulic assembly. A hydraulic hose can be crimped to the connector using a prior art nipple and socket arrangement.

To better retain the tube on the secondary fitting, barbs or a relatively sharp annular ring can be formed in the outer surface of the sleeve section of the secondary fitting. These barbs or annular ring can be located in various positions on the outer surface of the secondary fitting such as randomly positioned on the sleeve section of the secondary fitting. In the alternative, a press fit, crimping, adhesive(s), a collet system can be used to retain the tuning tube to the secondary fitting.

DETAILED DESCRIPTION

Figure 1:
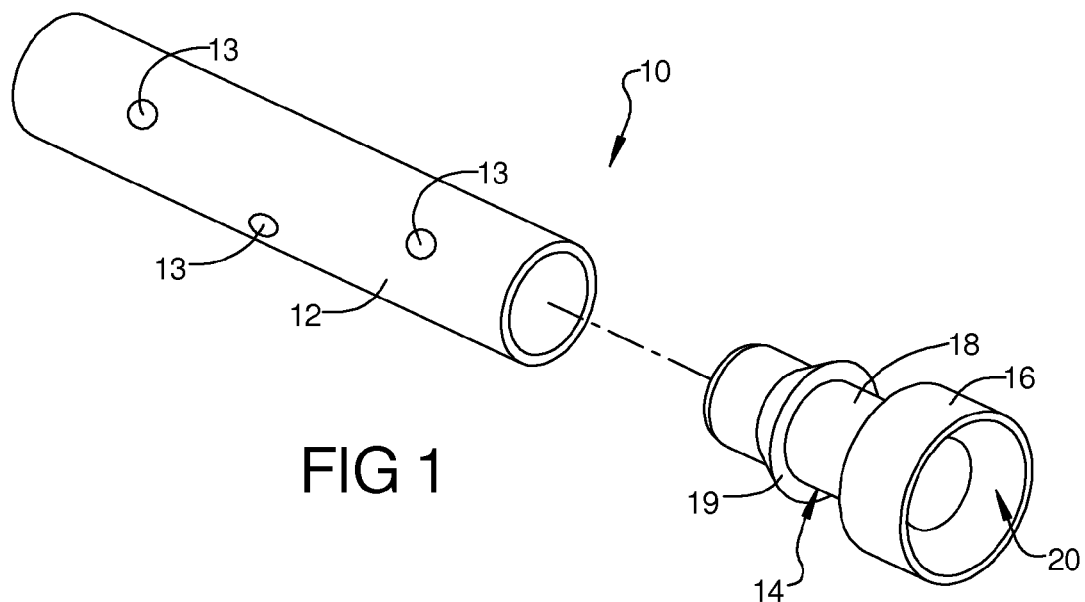
FIG. 1 is a perspective view of the exemplary tuning cable assembly.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

Figure 4:
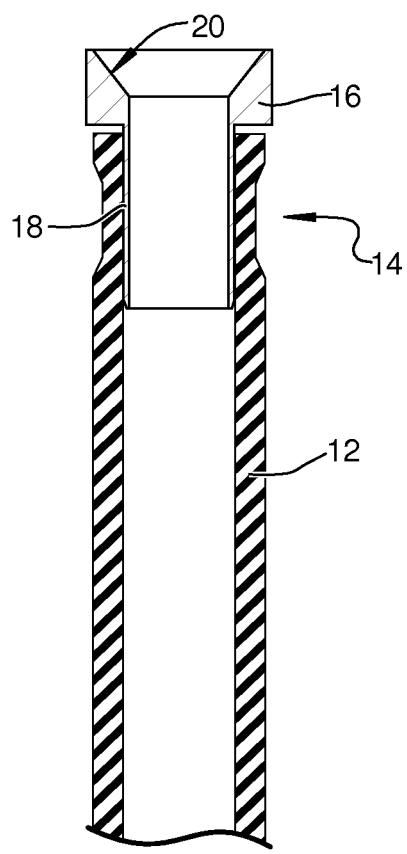
FIG. 4 is a cross-sectional view of the tuning cable and the secondary fitting where the tuning cable is attached to the secondary fitting by way of crimping.
Figure 5:
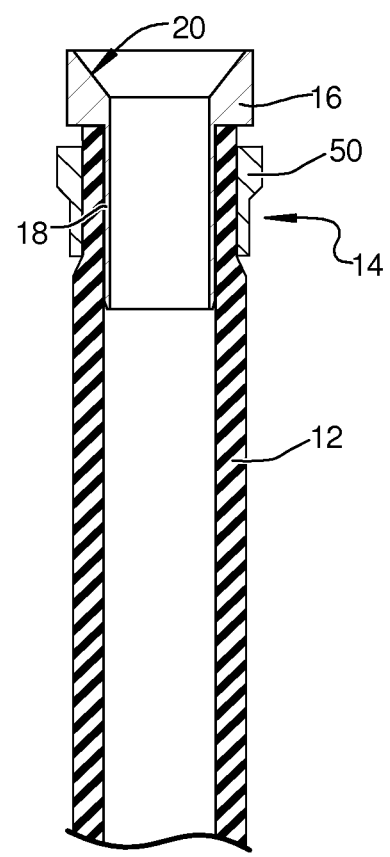
FIG. 5 is a cross-sectional view of the tuning cable and the secondary fitting where the tuning cable is attached to the secondary fitting by way of a collet.
Figure 6:
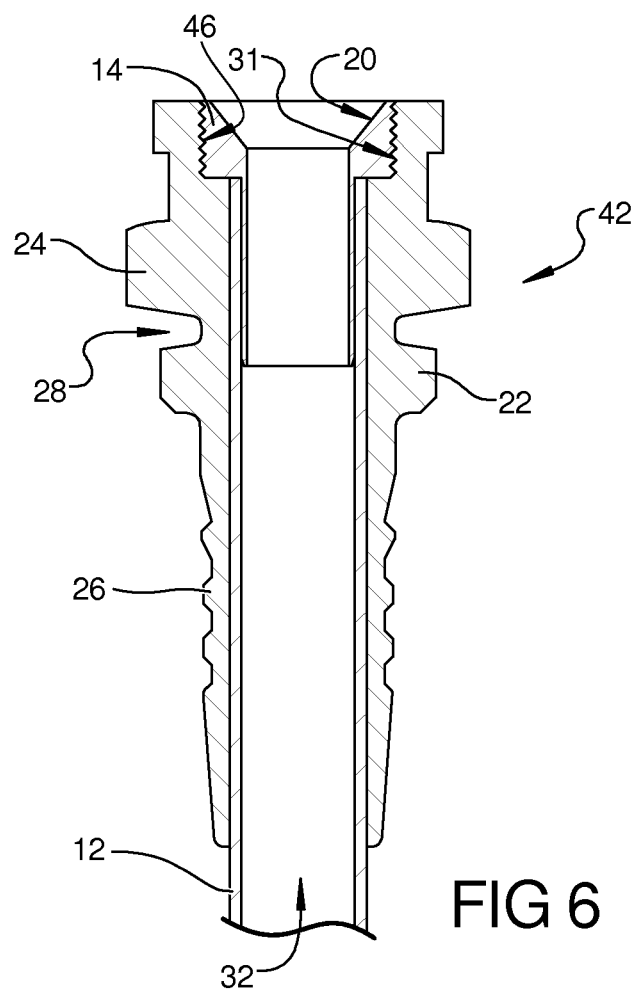
FIG. 6 is a cross-sectional view of the tuning cable and the secondary fitting where the tuning cable is attached to the secondary fitting by way of threads.

Now referring to FIG. 1 of the drawings, a perspective view of the exemplary tuning tube retention assembly 10 is shown. A tuning tube 12, also known as a tuning cable, can be made of a plastic or other similar known material, such as PTFE (Teflon) or nylon or rubber that is pressed onto the sleeve section 18 of a secondary fitting 14. The tuning tube 12 can be modified with one or more apertures 13 formed along its length to provide for a controlled leakage of the pressurized fluid for noise reduction. The shape, number and location of these apertures 13 are usually experimentally determined. The secondary fitting 14 has a collar section 16 that is joined to the sleeve section 18. The tuning tube 12 is pressed onto the sleeve section 18 of the secondary fitting 14 and is held by an interference fit between them. If additional retention is needed, one or more barb(s) 19 can be formed on the outer surface of the sleeve section 18 to hold the tuning tube 12 on the sleeve section 18. Other types of known retention methods can be used to hold the tuning tube 12 onto the sleeve section 18 of the secondary fitting 14 such as adhesive(s), crimping, as shown in FIG. 4, or a collet system 50 as shown in FIG. 5. The frustoconical shaped inlet section 20 of the secondary fitting 14 can be used to provide a hydraulic seal against another system component or fitting.

Figure 2:
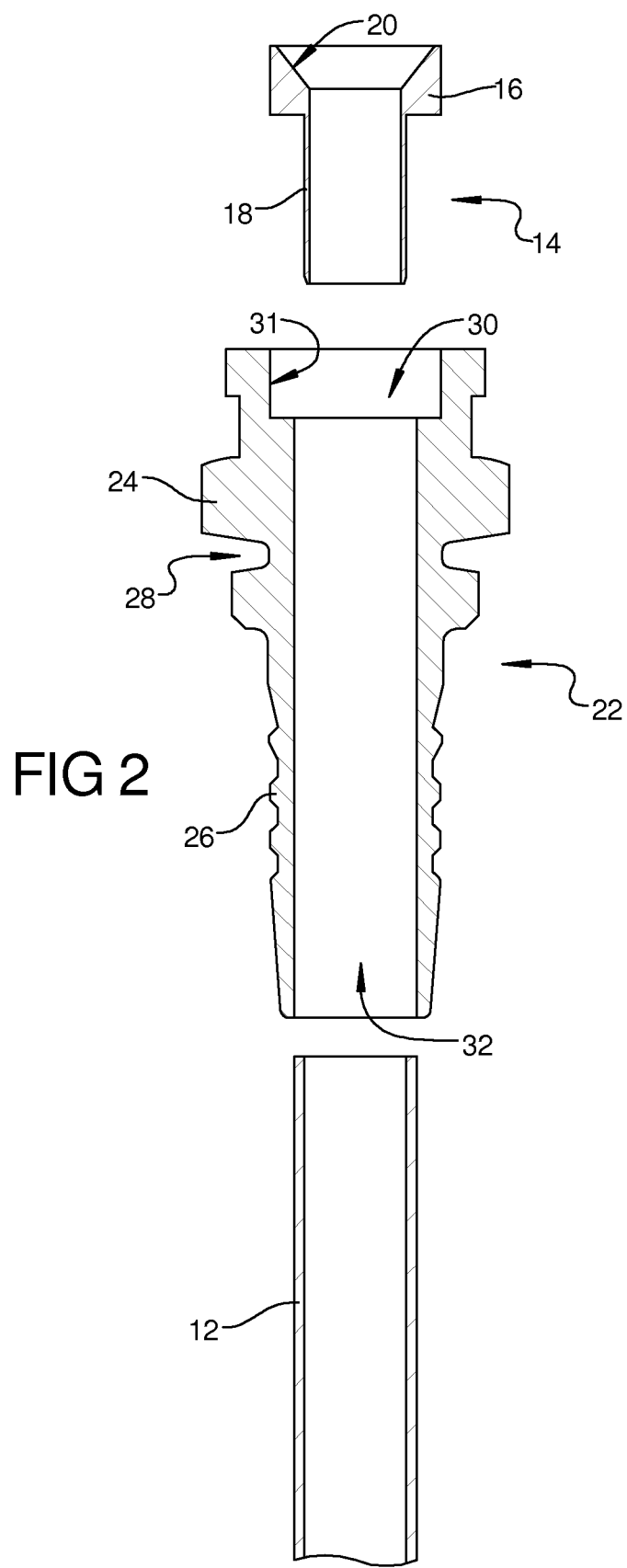
FIG. 2 is an exploded cross-sectional view of the tuning cable and secondary fitting and connector.

Now referring to FIG. 2 of the drawings, an exploded cross-sectional view of the exemplary secondary fitting 14, the tuning tube 12, and connector 22 is shown. The tuning tube 12 can be easily changed out without destroying the hydraulic hose assembly in which it is located where the tuning tube 12 is pressed onto the sleeve section 18 of the secondary fitting 14 and the secondary fitting 14 has a collar section 16 that is held in a receiving bore 31 formed in an inlet end 30 formed in the connector 22. The connector 22 is connected at the inlet end 30 to a hydraulic system component such as a pump and is connected at an outlet end 32 to a hydraulic hose 44 at the barbed nipple 26. The tuning tube 12 extends into the hydraulic hose 44 from the secondary fitting 14 and the connector 22.

The connector 22 has a main body 24 that is connected to a barbed nipple 26 that holds the hydraulic hose in position on the connector 22. To improve the retention of the hose 44 on the connector 22 a hose socket 44 can be attached to the connector 22 at the groove 28 and crimped against the outside of the hose to clamp the hose 44 between the socket and the barbed nipple 26. An inlet end 30 formed in the connector 22 has a receiving bore 31 that is sized to produce a slip fit with the collar section 16 of the secondary fitting 14. The outlet end 32 of the connector 22 is sized for a slip fit over the tuning tube 12. Thus, one method that can be used to assemble the components consists of sliding the connector 22 over the tuning tube 12, then pushing the tuning tube 12 onto the sleeve section 18 of the secondary fitting 14, and then slipping the secondary fitting 14 into the receiving bore inlet end 30 of the connector 22. The hydraulic hose 44 can then be pushed over the tuning tube 12 and onto the barbed nipple 26 of the connector 22 and the socket crimped onto the hose. Alternatively, the tuning tube 12 can be pressed onto the sleeve section 18 of the secondary fitting 14 and then the tuning tube 12 is inserted into the inlet end 30 of the connector 22 and the collar section 16 of the secondary fitting 14 inserted into the receiving bore 31 of the connector 22. The secondary fitting 14 can be attached to the connector 22 with threads 46. The connector 22 is then secured at its inlet end 30 to another hydraulic system component such as a pump. Other methods of retaining the tuning tube 12 can be retained to the sleeve section 18 using the methods discussed previously.

The tuning tube 12 is positioned inside the hydraulic hose and remains there until the operator desires to change the acoustic tuning frequencies by changing the length of the tuning tube 12 or the number, shape or position of the apertures 13. At that time, the connector 22 is disconnected from the hydraulic system at its inlet end 30 at the end opposite the hydraulic hose. The secondary fitting 14 with the attached tuning tube 12 is withdrawn from the connector 22 and a replacement secondary fitting 14 and attached longer or shorter tuning tube 12 is inserted into the connector 22 so that the collar section 16 engages and fits into the inlet cavity inlet end 30 and against the inside receiving bore 31. The connector 22 is then re-attached to the hydraulic system and the acoustic performance of the new tuning tube 12 can be evaluated. In the alternative, the tuning cable 12 itself can be switched onto the secondary fitting 14. To switch out the tuning cable 12, the secondary fitting 14 with the attached tuning cable 12 is pulled out of the connector 22 and the tuning cable 12 is pulled off the secondary fitting 14 and a replacement tuning cable is pressed onto the secondary fitting 14. The tuning cable retention assembly 10 is then re-inserted into the connector 22 until the collar section 18 engages the receiving bore 31. The connector 22 is then re-attached to another component of the hydraulic system.

Figure 3:
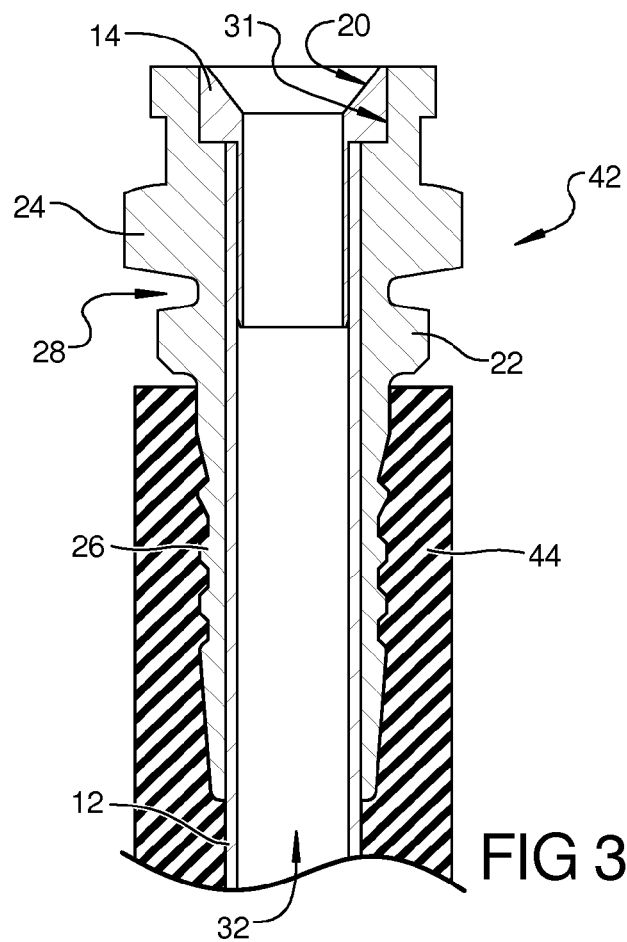
FIG. 3 is a cross-sectional view of the exemplary tuning cable assembly installed in a connector.

Now referring to FIG. 3 of the drawings, a cross-sectional assembly drawing of the exemplary tuning tube assembly 42 is shown. The tuning tube 12 has been pressed onto the sleeve section 18 of the secondary fitting 14 to form the tuning tube retention assembly 10. Then, the tuning tube retention assembly 10 is slipped into the bore outlet end 32 of the connector 22 until the collar section 16 fully engages the receiving bore 31 of the inlet end 30. Or, the tuning tube 12 can first be inserted into and through the connector 22 then pressed onto the sleeve section 18 of the secondary fitting 14. Then the tuning tube retention assembly 10 is slipped into the connector 22 so that the collar section 16 fully engages the receiving bore 31 at the inlet end 30 of the connector 22 thereby completing the tuning cable assembly 42. The tuning cable assembly 42 can then be installed into the hydraulic system. A hydraulic hose nipple 26 is shown formed at the outlet end of the connector 22 and is fashioned to fit inside a hose but other types of terminal fittings could be used instead of the nipple 26 to couple the connector 22 to another hydraulic system component or fitting. The fustoconical shape of the secondary fitting inlet section 20 of the secondary fitting 22 provides for a sealing surface with those other hydraulic system components but it too could be designed to mate with various known types of hydraulic system components or fittings.

To change out the tuning tube 12, the connector 22 is disconnected from its inlet end from the hydraulic system. The tuning tube retention assembly 10 is then withdrawn from the connector 22. Either a new tuning tube retention assembly 10 can be installed or, the current tuning tube 12 can be removed from the secondary fitting 14 and a replacement tuning tube 12 pressed onto the sleeve section 18 thereby making up a new tuning tube retention assembly 10 which is inserted into the connector 22 and the connector 22 is re-installed into the hydraulic system.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

We claim:

1. An improved apparatus for the reduction of fluid borne noise in a hydraulic system comprising:
   a hollow hydraulic hose for conveyance of a hydraulic fluid;
   a connector attached to said hydraulic hose at an outlet end, said connector having an inlet end, said inlet end having a receiving bore formed therein;
   a secondary fitting having a collar section adjacent to a sleeve section, where said collar section has an inlet end and an outlet end; and
   a tuning tube attached to said sleeve section where said tube extends inside of said hydraulic hose and where said collar section is located in said receiving bore;
   wherein said secondary fitting with said attached tuning tube is removably insertable into said connector and said attached hydraulic hose, so said collar section fully engages said receiving bore;
   wherein said receiving bore is configured so as to allow said secondary fitting to be removably inserted into said receiving bore; and
   wherein said inlet end of said connector coincides with said inlet end of said collar section of said secondary fitting.

2. The improved apparatus for the reduction of fluid borne noise in a hydraulic system of claim 1, wherein said secondary fitting is attached to said connector using threads.

3. The improved apparatus for the reduction of fluid borne noise in a hydraulic system of claim 1, wherein said tube is retained to said sleeve section using a barb formed on said sleeve section.

4. The improved apparatus for the reduction of fluid borne noise in a hydraulic system of claim 1, wherein said tube is retained to said sleeve section using crimping.

5. The improved apparatus for the reduction of fluid borne noise in a hydraulic system of claim 1, wherein said tube is retained to said sleeve section using an adhesive.

6. The improved apparatus for the reduction of fluid borne noise in a hydraulic system of claim 1, wherein said tube is retained to said sleeve section using a collet.

7. The improved apparatus for the reduction of fluid borne noise in a hydraulic system of claim 1, wherein said secondary fitting is attached to said connector using a press fit between said collar section of said secondary fitting and said receiving bore, and wherein the attachment between said secondary fitting and said connector is fluid-tight.

8. The improved apparatus for the reduction of fluid borne noise in a hydraulic system of claim 1, wherein said collar section has an inlet formed to provide a hydraulic seal with a hydraulic system component.

9. The improved apparatus for the reduction of fluid borne noise in a hydraulic system of claim 8, wherein said collar has an inlet with a frustoconical shape.

10. The improved apparatus for the reduction of fluid borne noise in a hydraulic system of claim 1, further comprising a replacement tuning tube, wherein said tuning tube can be removed from said sleeve section and said replacement tuning tube can be attached to said sleeve section.

11. The improved apparatus for the reduction of fluid borne noise in a hydraulic system of claim 10, wherein said secondary fitting with said replacement tuning tube is configured to be removably inserted into said connector so said collar section engages said receiving bore.

12. The improved apparatus for the reduction of fluid borne noise in a hydraulic system of claim 1, wherein said secondary fitting, once removed, is reusable and reinsertable into said connector and the attached hydraulic hose.

* * * * *